United States Patent
Ceze et al.

(10) Patent No.: US 9,063,749 B2
(45) Date of Patent: Jun. 23, 2015

(54) HARDWARE SUPPORT FOR HASHTABLES IN DYNAMIC LANGUAGES

(75) Inventors: Luis Ceze, Santa Clara, CA (US); Mohammad H. Reshadi, Santa Clara, CA (US); Thomas Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 895 days.

(21) Appl. No.: 13/181,712

(22) Filed: Jul. 13, 2011

(65) Prior Publication Data

US 2012/0304159 A1 Nov. 29, 2012

Related U.S. Application Data

(60) Provisional application No. 61/491,075, filed on May 27, 2011.

(51) Int. Cl.
*G06F 9/44* (2006.01)
*G06F 9/45* (2006.01)

(52) U.S. Cl.
CPC .. *G06F 8/44* (2013.01); *G06F 8/31* (2013.01); *G06F 9/4433* (2013.01)

(58) Field of Classification Search
CPC ..... G06F 12/0223; G06F 12/023; G06F 8/20; G06F 17/30501; G06F 17/30949
See application file for complete search history.

(56) References Cited

U.S. PATENT DOCUMENTS

| | | | |
|---|---|---|---|
| 5,809,494 A * | 9/1998 | Nguyen | 1/1 |
| 6,591,274 B1 * | 7/2003 | Smith et al. | 717/116 |
| 6,862,728 B2 * | 3/2005 | Darnell et al. | 717/148 |
| 6,952,730 B1 | 10/2005 | Najork et al. | |
| 7,039,764 B1 * | 5/2006 | Shetty et al. | 711/133 |
| 7,188,334 B1 * | 3/2007 | Sinclair | 717/116 |
| 7,502,972 B1 * | 3/2009 | Chilukuri et al. | 714/45 |
| 7,664,323 B2 * | 2/2010 | Chellapilla et al. | 382/181 |

(Continued)

FOREIGN PATENT DOCUMENTS

| | | |
|---|---|---|
| JP | 2003524934 A | 8/2003 |
| JP | 2009080696 A | 4/2009 |
| JP | 2010050600 A | 3/2010 |

OTHER PUBLICATIONS

Haoyu Song et al.; Fast Hash Table Lookup Using Extended Bloom Filter an Aid to Network Processing; 2005 Sigcomm; pp. 181-192; <http://dl.acm.org/citation.cfm?id=1080114>.*

(Continued)

*Primary Examiner* — Thuy Dao
*Assistant Examiner* — Cuong V Luu

(57) ABSTRACT

The aspects enable a computing device to execute traditionally software-based JavaScript® operations in hardware. Each JavaScript® object is hashed into a master hashtable that may be stored in the software. A portion of the software hashtable may be pushed to a hardware hashtable using special instruction set registers dedicated to hashtable processing. Each time a software process requests a hashtable operation (e.g., lookup) the hardware hashtable is checked to determine if the value exists in hardware. If the requested value is in the hardware hashtable, the requested value is accessed in a single operation step. If the requested value is not in the hardware hashtable, the requested value is extracted from the master hashtable in the software and a portion of the master hashtable containing the extracted value is pushed to the hardware using special instruction set registers.

58 Claims, 8 Drawing Sheets

(56) References Cited

U.S. PATENT DOCUMENTS

| | | | |
|---|---|---|---|
| 7,676,661 | B1 | 3/2010 | Mohan et al. |
| 8,024,719 | B2* | 9/2011 | Gorton, Jr. .................... 717/158 |
| 8,122,430 | B2* | 2/2012 | De Sutter et al. ............. 717/116 |
| 8,180,917 | B1* | 5/2012 | Yan et al. ...................... 709/234 |
| 8,387,003 | B2* | 2/2013 | Darcy ........................... 717/106 |
| 8,543,543 | B2* | 9/2013 | Marcelais et al. ............. 717/116 |
| 2002/0108107 | A1* | 8/2002 | Darnell et al. ................. 717/153 |
| 2005/0071810 | A1* | 3/2005 | Sutter et al. ................... 717/116 |
| 2005/0165828 | A1* | 7/2005 | Lango et al. ................... 707/102 |
| 2005/0171937 | A1* | 8/2005 | Hughes et al. .................... 707/3 |
| 2006/0253837 | A1* | 11/2006 | Hudson et al. ................ 717/124 |
| 2007/0113222 | A1* | 5/2007 | Dignum et al. ............... 717/143 |
| 2008/0215849 | A1 | 9/2008 | Scott |
| 2009/0193224 | A1 | 7/2009 | Vishnu et al. |
| 2010/0095271 | A1* | 4/2010 | Archambault et al. ........ 717/110 |

OTHER PUBLICATIONS

Aristides Gionis et al.; Similarity Search in High Dimensions via Hashing; 1999 VLDB; pp. 518-529; <http://www.cs.princeton.edu/courses/archive/spring13/cos598C/Gionis.pdf>.*

Witold Litwin; Linear Hashing a New Tool for File and Table Addressing; 1980 IEEE; pp. 212-223; <http://202.120.223.158/Download/119b1d2b-1b2a-49ae-8597-2ff17bb529b4.pdf>.*

Mayur Datar et al.; Locality-Sensitive Hashing Scheme Based on p-Stable Distributions; 2004 SCG; pp. 253-262; <http://dl.acm.org/citation.cfm?id=997857>.*

Pierre Wolper et al.; Reliable Hashing without Collision Detection; 2005 Springer; pp. 59-70; <http://link.springer.com/chapter/10.1007/3-540-56922-7_6>.*

Justin Zobel et al.; In-memory hash tables for accumulating text vocabularies; 2000 RMIT university; pp. 271-277; <http://www.sciencedirect.com/science/article/pii/S0020019001002393>.*

C. Courcoubetis et al.; Memory-Efficient Algorithms for the Verification of Temporal Properties; 1992 Kluwer Academic Publishers; pp. 129-142; <http://link.springer.com/chapter/10.1007/978-1-4615-3556-0_5#page-1>.*

Maged M. Michael; High Performance Dynamic Lock-Free Hash Tables and List-Based Sets; 2002 ACM; pp. 73-82; <http://dl.acm.org/citation.cfm?id=564881>.*

Brad Karp et al.; GHT a geographic hash table for data-centric storage; 2002 ACM; pp. 78-87; <http://dl.acm.org/citation.cfm?id=570750>.*

Alex C. Snoeren et al.; Hash-based IP traceback; 2001 ACM; pp. 3-14; <http://dl.acm.org/citation.cfm?id=383060>.*

Tobin J. Lehman et al.; A Study of Index Structures for Main Memory Database Management Systems; 1986 Kyoto; pp. 294-303; <http://www.vldb.org/conf/1986/P294.PDF>.*

Diwaker Gupta; Difference engine harnessing memory redundancy in virtual machines; 2010 ACM; pp. 85-93; <http://dl.acm.org/citation.cfm?id=1831429>.*

International Search Report and Written Opinion—PCT/US2012/038797, International Search Authority—European Patent Office, Jul. 30, 2012.

Morita, H., "Runaway Evolution of Google Machines—Part 2: Thorough Analysis Why is the New V8 Engine so Fast?", Nikkei Electronics, Nikkei Business Publications, Inc., Nov. 3, 2008, vol. 990, pp. 61-73.

Yamamoto, T., Topic 1: Standard Techniques for Speeding Up Program Execution—Part 2: 20 Techniques that VB, C++, Java Programmers Should Know, Nikkei Software, Nikkei Business Publications, Inc., Sep. 24, 2001, vol. 10 (vol. 41 since first issue), pp. 52-63.

* cited by examiner

|      | Value  | Index |
|------|--------|-------|
| 1005 | 500846 | 0     |
| 1006 | 510739 | 1     |
| 1007 | 489954 | 2     |

FIG. 1

| Key |
|-----|-----|
| 1005 | 20 |
| 1006 | 105 |
| 1007 | 155 |

| Value |     |
|-------|-----|
| 500846 | 20 |
| John Smith | 21 |
| (555) 555-0001 | 22 |
| 1111 Parkway Rd | 23 |
| Sr. Manager | 24 |
|  | 25 |
| ⋮ | ⋮ |
| 510739 | 105 |
| Jane Smith | 106 |
| (555) 555-9200 | 107 |
| 2222 Maple St | 108 |
| Jr. Manager | 109 |
|  | 110 |
| ⋮ | ⋮ |
| 489954 | 155 |
| John Doe | 156 |
| (555) 555-0345 | 157 |
| 2222 Oak St | 158 |
| Engineer | 159 |
|  | 160 |

HARDWARE SUPPORT FOR HASHTABLES IN DYNAMIC LANGUAGES

RELATED APPLICATIONS

The present application claims the benefit of priority to U.S. Provisional Patent Application No. 61/491,075 entitled "Hardware Support for Hashtables in Dynamic Languages" filed May 27, 2011, the entire contents of which are hereby incorporated by reference for all purposes.

FIELD

The present application relates generally to computer software and hardware, and more particularly to methods, systems, and devices for reducing the energy cost of performing hashtable operations while accelerating the hashtable operation execution.

BACKGROUND

Certain dynamic software languages, such as JavaScript®, may be viewed as implementing hashtable functionality at their core. In computer science, a hashtable or hash map is a data structure that uses a hash function to map identifying values, known as keys (e.g., a person's name), to their associated values (e.g., their telephone number). Thus, a hashtable implements an associative array. The hash function is used to transform the key into the index (the hash) of an array element (or memory location) where the corresponding value is to be sought.

SUMMARY

By characterizing the operations of software languages like JavaScript® as being fundamental hashtable operations, specialized hardware hashtable processors may be used to assist processing, improving efficiency, speed, and energy consumption of computing devices. The various aspect disclosed herein provide methods, systems and devices for a JavaScript® runtime engine that implements the features of an efficient hashtable. In an aspect, JavaScript® code is compiled to encode JavaScript® hashtable string keys as hashtable integer keys and the encoded hashtable integer keys may be stored in a memory accessible by software. A portion of the encoded hashtable integer keys may be loaded into a dedicated memory of a hardware processor via a first dedicated hardware instruction. On JavaScript® operations requiring hashtable lookup, a dedicated hardware instruction on the processor may be executed to determine whether the hashtable value can be retrieved by the hardware processor. If the key is stored in the hardware processor, a hardware-based hashtable lookup may be executed to return the corresponding hashtable integer keys. If the key is not stored in the hardware processor, a software-based hashtable look-up may be executed to retrieve the requested hashtable value and a portion of the encoded hashtable integer keys may be stored in the software accessible memory. In an aspect, the dedicated memory of the hardware processor may be updated by loading the retrieved portions of encoded hashtable integer keys into the dedicated memory of the hardware processor via a second dedicated hardware instruction.

An aspect includes a method for executing dynamic software language code that includes operations of compiling the dynamic software language code to encode hashtable string keys as hashtable integer keys, storing the encoded hashtable integer keys in a memory accessible by software, and loading a portion of the encoded hashtable integer keys into a dedicated hardware hashtable implementation via a first dedicated hardware instruction. In an aspect method, the first dedicated hardware instruction may be a SET instruction that pushes values to the dedicated hardware hashtable implementation. An aspect method may further include determining if the hashtable value may be retrieved by a hardware processor by executing a dedicated hardware instruction on the hardware processor on each dynamic software language operation requiring hashtable lookup, and executing a hardware-based hashtable lookup to return the corresponding hashtable integer keys if the key is stored in the hardware processor. An aspect method may further include executing a software-based hashtable look-up to retrieve the requested hashtable value and a portion of the encoded hashtable integer keys stored in the software accessible memory if the key is not on the hardware processor, and updating the dedicated hardware hashtable implementation by loading the retrieved portions of encoded hashtable integer keys into a dedicated memory of the hardware processor via a second dedicated hardware instruction. In an aspect method, the second dedicated hardware instruction may be a GET instruction that retrieves values from the dedicated memory of the hardware processor. In an aspect method, encoding hashtable string keys as hashtable integer keys may be accomplished exactly once at compile time and the loading of a portion of the encoded hashtable integer keys is executed on each dynamic software language operation request. In an aspect method, the dynamic software language code may be JavaScript® code, and compiling the dynamic software language code to encode hashtable string keys as hashtable integer keys may include compiling JavaScript code to encode JavaScript hash-table string keys as hash-table integer keys. In an aspect method, encoding JavaScript® hash-table string keys as hashtable integer keys may be accomplished exactly once at compile time and the loading of a portion of the encoded hashtable integer keys may be executed on each JavaScript® operation request. In an aspect method, the first dedicated hardware instruction may be a STORE instruction that pushes values to the dedicated hardware hashtable implementation by storing the values in a memory-mapped location. In an aspect method, loading a portion of the encoded hashtable integer keys into a dedicated hardware hashtable implementation may include loading a portion of the encoded hashtable integer keys into a dedicated hardware hashtable implementation on a co-processor coupled to a primary processor. In an aspect method, compiling the dynamic software language code to encode hashtable string keys as hashtable integer keys may be performed by a first processor of a computing device and loading a portion of the encoded hashtable integer keys into a dedicated hardware hashtable implementation via a first dedicated hardware instruction is performed by a second processor of the computing device. In an aspect method, the second processor of the computing device may be a specialized hashtable co-processor, and the method may further include determining if the hashtable value may be retrieved by executing a second dedicated hardware instruction on the specialized hashtable co-processor on each dynamic software language operation requiring hashtable lookup, and executing a hardware-based hashtable lookup on the specialized hashtable co-processor to receive the corresponding hashtable integer keys on the first processor of the computing device if it is determined that the hashtable value may be retrieved.

Another aspect includes a computing device including a processor coupled to memory in which the processor is configured with processor-executable instructions to perform operations of the various aspect methods described above.

Another aspect includes a computing device including means for performing the functions and operations of the various aspect methods described above. Another aspect includes a non-transitory processor readable medium which has stored thereon processor-executable instructions configured to cause a processor to perform operations of the various aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 1 is a data structure diagram that illustrates the features of an example array.

FIG. 2 is a data structure diagram that illustrates the features of an example implementation of an associative array.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "electronic device," "mobile device" and "computing device" are used interchangeably herein to refer to any one or all of personal computers, cellular telephones, personal data assistants (PDA's), palm-top computers, tablet computers, wireless electronic mail receivers (e.g., the Blackberry® devices), multimedia Internet enabled cellular telephones, and similar personal electronic devices which include a programmable processor. While the various aspects are particularly useful in mobile devices, such as cellular telephones, which may have limited processing power, the aspects are generally useful in any computing device that executes scripts and/or applications written in dynamic, scripting and/or markup languages.

The terms "dynamic language" and "scripting language" are used generically and interchangeably in this application to refer to any dynamic language, scripting language, or any interpreted language used to write programs (herein as "scripts") that are interpreted and/or compiled at runtime. These terms may also refer to any language that runs on a managed runtime. Thus, for the purposes of this application, the terms "dynamic language" and "scripting language" should not be limited to languages that are interpreted from source code or bytecode, or to those that execute along with programs that are traditionally compiled into native machine code. Examples of dynamic and scripting languages within the scope of this application include, for example, JavaScript®, Perl, Python, and Ruby, as well as Java and other languages that may be developed in the future.

For ease of reference, the various aspects are described using JavaScript® terminology. However, the use of this terminology and the use of JavaScript® examples should not be construed as limiting the scope of the claims to a particular software language or technology unless specifically recited in the claims.

Figure 3:
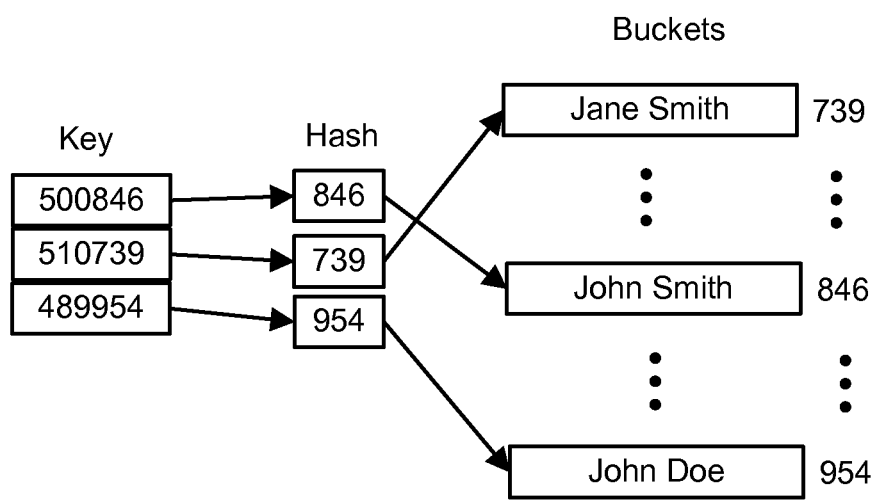
FIG. 3 is a data structure diagram that illustrates the features of a hashtable implementation of an associative array.

FIGS. 1-3 illustrate the data structure elements and basic operations of various known data structures. Since these structures are well known, many details (e.g., storage of the different types of data, memory sizes, etc.) have been omitted in order to focus the descriptions on the relevant features.

FIG. 1 is an illustration of an example array 100 storing employee identifier (ID) values. Arrays generally store a number of values sequentially in memory such that each value may be a reference by its relative position in the memory (i.e., index). For example, FIG. 1 illustrates that the example array 100 stores employee ID values sequentially with each value (e.g., ID) associated with an index (e.g., 1, 2, 3). The sequential nature of arrays means that an instruction to retrieve a value from the array based on a index (e.g., getArrayItem[2]) generally requires that the system access the memory location of the first element in the array (e.g., memory location "1005") and increment the memory location by the index value (e.g., "2") to locate the desired item (e.g., value "489954" at memory location "1007"). The location of a particular value within the array is generally unknown to the array. To find a particular value, each item in the array may be examined until the value is found and the index associated with that value is identified.

FIG. 2 is an illustration of an example implementation of an associative array 200. An associative array is an abstract data type composed of a collection of unique keys and a collection of values, where each key is associated with one value or a set of values. FIG. 2 illustrates how associative array 200 contains unique key values (e.g., integer values 20, 105 and 155) that identify other memory locations (e.g., memory locations 20, 105 and 155) where a desired value (e.g., employee ID) may be stored. FIG. 2 also illustrates that each employee ID 202 may be stored relative to other relevant information, such as an employee name 204, phone number 206, address 208, and job title 210. In this manner, when a desired value (e.g., employee ID) is located, other information related to the desired value may also be located based on their position in memory relative to the desired value. For example, an instruction to retrieve a value based on its index (e.g., getArrayItem[2]) may instruct a processor to access the memory location of the first element in the array (e.g., memory location 1005), increment the memory location by the index value (e.g., 2) to locate the desired key value (e.g., key 155 at memory location 1007), access a second memory location associated with the key value (e.g., memory location 155) and return the value (or a pointer to the value) stored in the second memory (e.g., value 489954 at memory location 155). Thus, information related to the desired value (which is stored relative to the desired value) may be retrieved at the same time as the desired value.

While the example implementations discussed above with reference to FIG. 2 allows multiple items to the associated with a single array element (i.e., key), accessing the array element is still a sequential process (e.g., index value is still an offset). In this type of data structure there is no efficient way to determine the location (e.g., index) of a given value without traversing, searching and/or sorting the array. While many techniques exist for sorting and/or searching arrays, array operations are still relatively expensive and slow.

FIG. 3 illustrates an example hashtable implementation of an associative array. Hashtables use a hash function to map the keys to their associated values by transforming the key value into an index of an array element (e.g., the memory location) where the corresponding value is to be sought. FIG. 3 illustrates an example in which the array memory locations (e.g., memory locations 1005, 1006, 1007) may contain the employee IDs as key values. A hash function may be performed on the key values (e.g., employee ids) to generate hash values (e.g., 846, 739, 954) that identify the locations of the corresponding values (e.g., memory locations 739, 846, 954). The hash function may use any one of a large number of available mathematical formulas to convert the key values to hash values. In the example illustrated in FIG. 3, the hash function uses the last three digits of the key value as the hash value and stores the relevant information (e.g., name) relative to the location identified by the hash. In this manner, an instruction to retrieve a value from the hashtable (e.g., getItem[489954]) simply requires hashing the key value (e.g., 489954) and accessing the memory location of the hash value (954) to locate the desired item (e.g., John Doe at memory location 954).

Because hashtables are very fast and efficient, implementing the basic hashtable functionality greatly improves efficiency, speed, energy consumption, as well as many other performance factors. However, hashtables are generally a software construct and modern hardware manufacturers do not provide processors that provide native hashtable functionality.

The various aspects provide methods, systems and devices for allowing applications to execute hashtable operations (e.g., lookup) in hardware. The execution of hashtable operations may be assisted or controlled by special instruction registers on the microprocessor, via memory mapped input/output (MMIO) accelerator devices and/or by using one or more co-processors. The various aspects also combine hashtable functionality with the principle of locality to greatly improve the performance of software languages, such as JavaScript®, that implement basic hashtable functionality.

The "principle of locality" is a principle typically associated with designing virtual memories and caches. The principle of locality generally states that if a process request accesses an item in memory, it is highly likely to request access to another item close to that memory sometime in the near future. According to the principle, it is generally beneficially to fetch the entire memory block in which the item is located (as opposed to retrieving only the requested item) and move the fetched block into a faster and more assessable memory for future access.

It is beneficial for hardware systems to implement techniques that exploit the principle of locality. Today's microprocessors operate at much faster speeds than do modern memories. Thus, a major hardware bottle neck in processing is the time it takes to access external memories. For example, due to the relatively slow speeds of memories and thus the time required to accomplish a memory access, microprocessors may enter a wait state (or take up processing to a different thread) between processor operations involving a memory read or write operation in order to allow enough time for the memory to be ready for the next operation. To reduce this processor wait time, modern computer architectures use cache memories that match the speed of memory access to the operations speed of the processor. A cache memory is a small, expensive and fast memory that the processor can access much faster than the other memories in the computing device (e.g., hard disks, capacitor-based memories, random access memories, read only memories, etc.). Whenever a byte at a given memory address is requested, the processor first attempts to obtain the data from the faster cache memory. However, if the cache does not contain the requested data, the processor enters a wait state while the requested data is loaded from one of the other, slower, system memories. Thus, the effectiveness of cache memory (e.g., the overall improvement in processing speed) is directly related to how often the cache memory contains data requested by the processor.

To maximize performance, processors or cache memory controllers may predict data that the processor is going to need next or in future operations, and load that data into cache before the processor requests the data. Since locating a given memory location is much slower than reading data from the memory, modern cache memories exploit the principle of locality (i.e., that processors tend to access only a small part of the address space at a given point in time) to load entire blocks of data in anticipation that data stored close to a referenced memory is also likely to be referenced by the processor in the near future.

In addition to exploiting the principle of locality to improve overall processor performance, modern page table translation systems of various operating systems use the principle of locality to translate page tables from virtual memory to physical memory. As a result, operating system may run more processes concurrently than would otherwise fit into physical memory.

Figure 4:
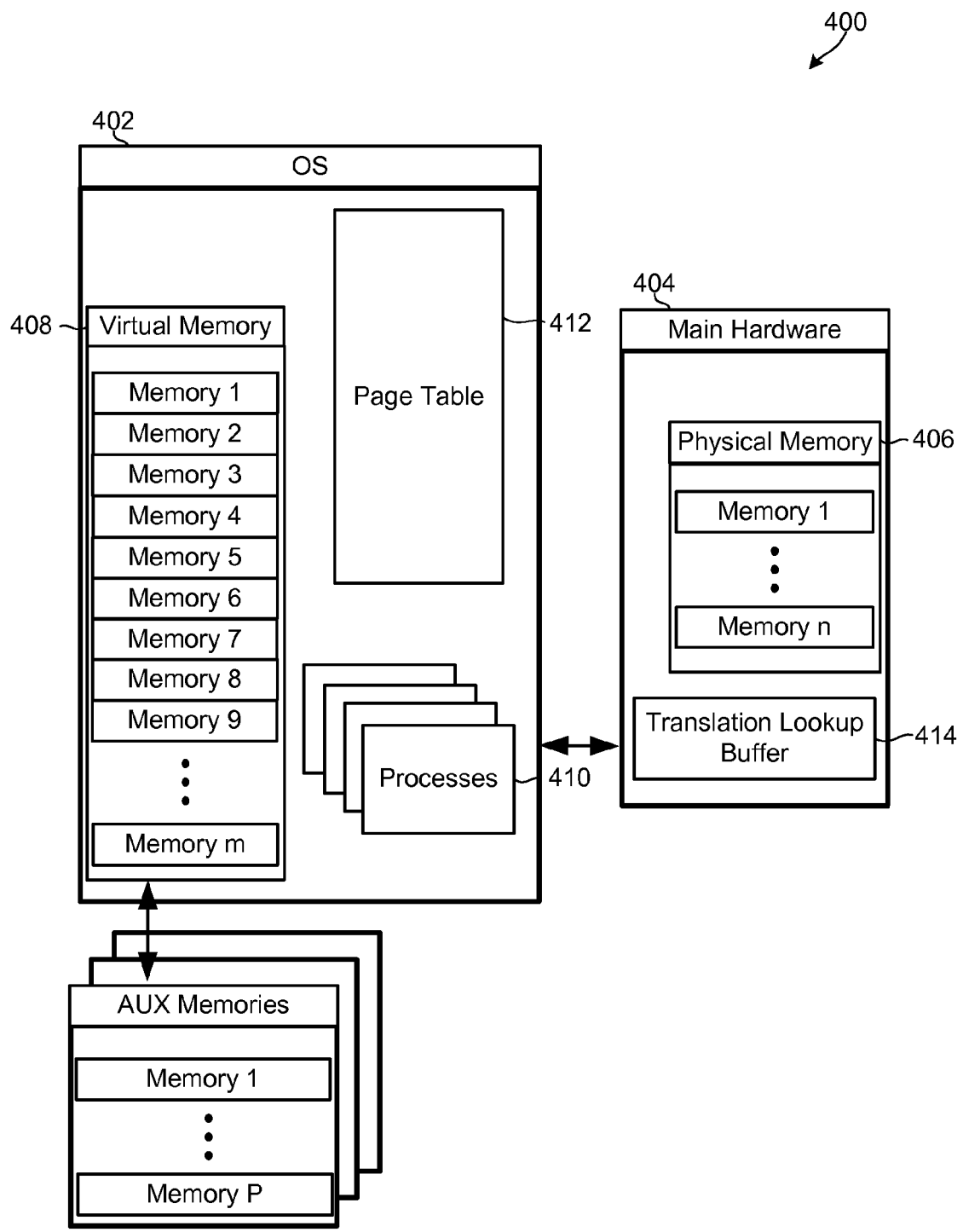
FIG. 4 is a functional component diagram of a processor that illustrates an example page table translation system.

FIG. 4 illustrates functional components of a computing device implementing an example page table translation system 400. As illustrated in FIG. 4, an operating system 402 running on a computing device may utilize a combination of physical memory 406 and virtual memory 408 to support the concurrent execution of a large number of processes 410. The physical memory 406 provides an address space (memory 1-*n*) that is limited by the size and number of memory modules actually installed in the computer. In contrast, the virtual memory 408 provides a much larger address space (memory 1-*m*) that allows the computing device to run more processes concurrently than actually fits in physical memory 406. That is, the existence of the virtual memory 408 allows the computing device to work primarily from a faster but smaller memory (e.g., physical memory 406), while at the same time having access to information stored in the slower but much larger bulk storage memory (e.g., virtual memory 408). Whenever a process requests access to information that is not in the physical memory 406, the computing device may fetch the information from the virtual memory 408 and move the requested information (or a block containing the information) to the physical memory 406. A page table 412 may be used to map the physical memory 406 to the virtual memory 408. The page table 412 is discussed in more detail below.

FIG. 4 illustrates that the operating system 402 may include a page table 412 that stores mapping information used to implement an address translation scheme (i.e., address mapping) between the virtual memory 408 and the physical memory 406. Likewise, the hardware 404 may include a translation lookup buffer 414 that contains recently used mappings from the page table 412. Whenever a virtual to physical address translation is required, the system may first check the translation lookup buffer 414 to determine whether the buffer 414 contains the necessary mapping information. If the translation lookup buffer 414 contains the necessary mapping information (e.g., a match is found), the physical memory address is provided to the requesting process and data access proceeds. However, if no match is found, the operating system 402 checks the page table 412 to determine if the page table 412 contains the requested mapping information. If the mapping information is found in the page table 412, the information (or its containing block of information) may be written to the translation buffer 414 of the hardware 404 after which data access proceeds.

As discussed above, the page table 412 may map the physical memories 406 to the virtual memories 408, and the translation lookup buffer 414 may contain a block of recently used and/or predicted physical memory mapping information. Depending on the nature of the mapping, the translation lookup buffer 414 may be viewed as a primitive hardware implementation of a hardware hashtable. However, even when viewed in this light, current solutions (e.g., page table translation systems) implement this mapping in a highly protected layer of the processor such that it is accessible only in "super-user mode," only to operating system processes, and only for one type of application (e.g., page table lookups).

The various aspects provide systems, methods and devices that include dedicated processor circuits implementing hardware-based hash operations that are available to applications. The various aspects grant user level (e.g., user mode) permissions/access to the hardware hash operations. The various aspects provide a compiler that generates code that can be interpreted and/or executed in both software and hardware hashtable logic. The various aspects enable application developers to exploit the fundamental structure of various software languages, such as JavaScript®, to improve the efficiency and execution/interpretation time of software programs and processes.

As mentioned above, certain software languages like JavaScript® may be viewed as implementing hashtable functionality at their core. JavaScript® is an object oriented scripting language in which the simplest construct is an "Object" data type. In JavaScript®, objects are implemented as a collection of named properties, which are simply JavaScript® objects owned by another JavaScript® object (i.e., they are objects local to another object). Properties may be accessed using either the dot-operator (e.g., "object.property") or brackets (e.g., "object[property]"). Considering that hashtables locate/access elements using a similar syntax and logic, each JavaScript® object may be viewed as being a hashtable implementation. For example, in JavaScript®, writing to property "x" of an object "o" (e.g. o.x=10) may be viewed as being equivalent to a hash insert in object "o" (e.g., o[x]=10) and reading property "x" of an object "o" (e.g., z=o.x) may be viewed as being equivalent to a hash read in object "o" (e.g., z=o[x]). When viewed in this light, every JavaScript® operation may be characterized as being special type of hash operation that goes from a string value (key) through another string or number value (value), and every JavaScript® object may be viewed as being a hashtable implementation of a an associative array.

By characterizing each JavaScript® operation as being fundamentally a hashtable operation, dedicated hashtable processors may be used to process JavaScript® objects. The dedicated hashtable processors may include circuitry (embedded in a microprocessor) reserved for performing hashtable operations. The processor may be configured with special instruction registers that allow applications to access the hardware hashtable logic to execute JavaScript® functionality. The special instruction registers may be accessed using a modified instruction set architecture (ISA) that allows software applications to access the hardware-based hashing operations with a reduced number of instructions. For example, a "get" machine language instruction and a "set" machine language instruction may be added to a dedicated hashtable processor such that JavaScript® compilers and applications may more readily execute hashtable lookups in hardware using a single instruction (e.g., GET or SET). The hardware implementation of the hashtable may also be accessed via a combination of normal ISA and special registers or memory addresses.

Figure 5A:
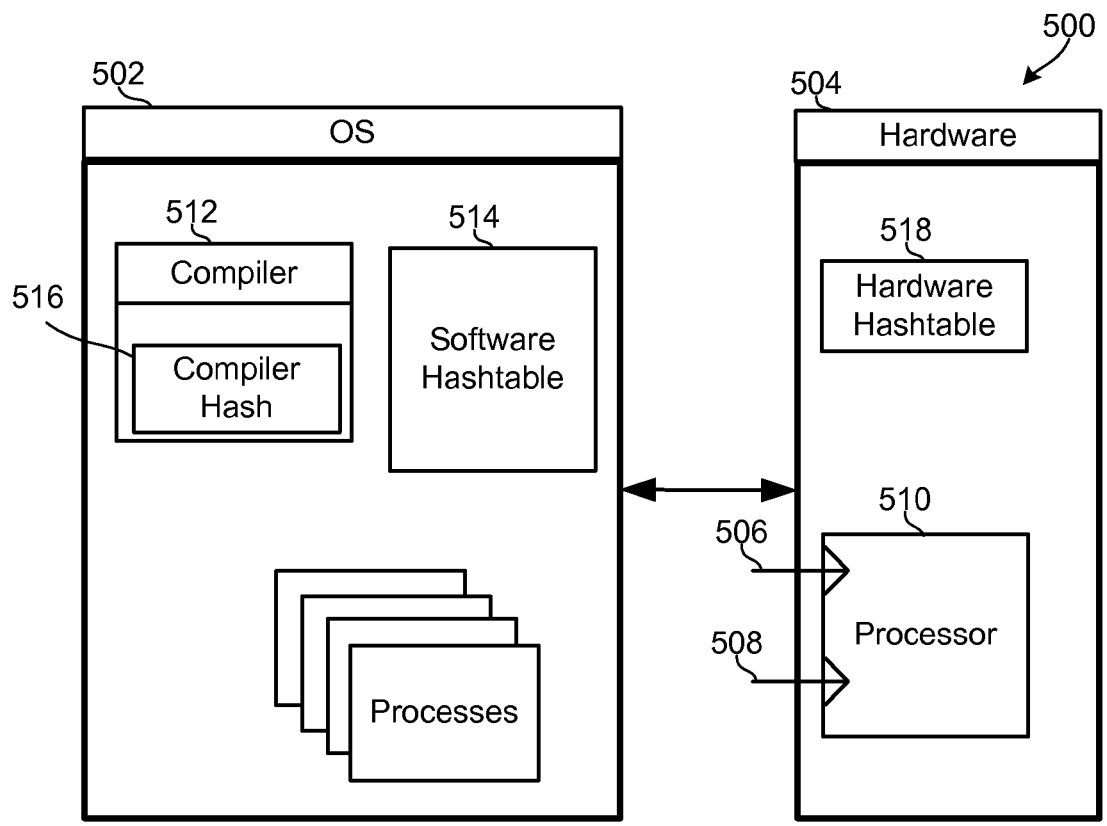
FIG. 5A is a functional component diagram of a computing device architecture for executing hashtable operations in hardware in accordance with the various aspects.

FIG. 5A illustrates an example computing device architecture 500 for executing hashtable operations (e.g., JavaScript) in a combination of hardware and software. FIG. 5A illustrates that the computing device architecture may include an operating system 502 in communication with hardware 504 having a specialized processor 510 and one or more hardware hashtables 518. The specialized processor 510 may include specialized circuitry capable of executing the hashtable operations, such as reading and writing values to the hardware hashtable 518. The processor 510 may further be configured to include a "get" machine language instruction register 506 and a "set" machine language instruction register 508 that together provide access to the specialized circuitry and the hardware hashtables 518.

Figure 5B:
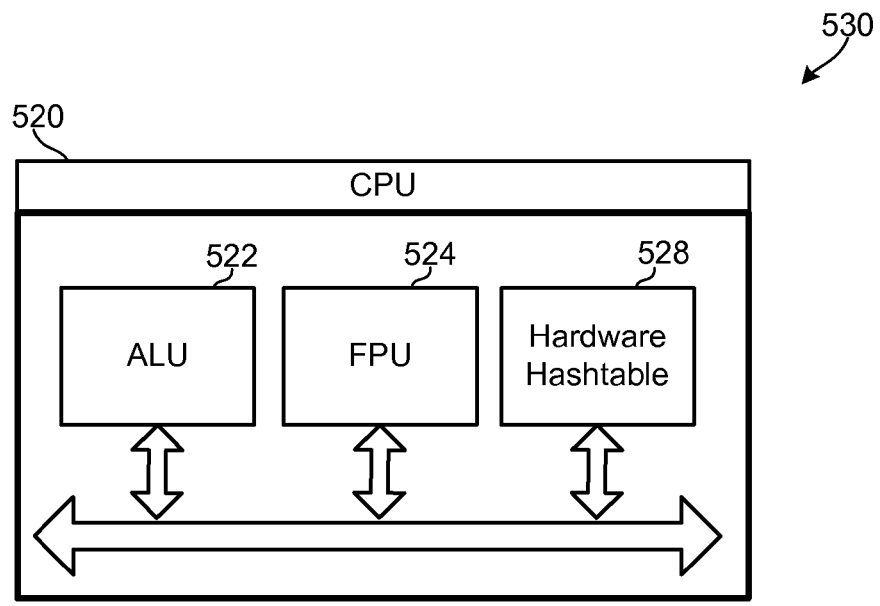
FIGS. 5B-5D are circuit block diagrams of alternative computing device architectures including memory and processor components for executing hashtable operations in hardware in accordance with the various aspects.

FIG. 5B illustrates an example embodiment hardware architecture 530 of the hardware 504 for executing hashtable operations in a combination of hardware and software. This embodiment hardware architecture 530 may include a central processing unit 520 that includes an arithmetic logic unit (ALU) 522 for performing arithmetic and logical operations, a floating-point unit (FPU) 524 for performing floating point operations (e.g., addition, subtraction, multiplication, division, square root, etc.), and a hardware hashtable implementation unit 528. The hardware hashtable implementation unit 528 may include registers/memory for storing hashtable values which corresponds to the hardware hashtable 518 discussed above. These registers and/or memory are sometimes referred to herein as a hashtable memory.

Figure 5C:
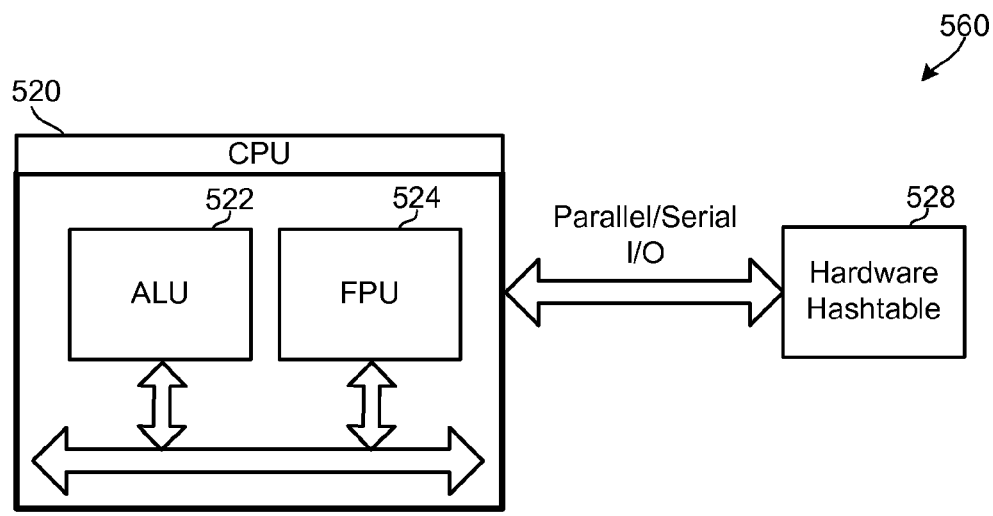

FIG. 5C illustrates another example embodiment hardware architecture 560 of the hardware 504 for executing hashtable operations in a combination of hardware and software. This embodiment hardware architecture 560 may include a central processing unit (CPU) 520 that includes an arithmetic logic unit (ALU) 522 and a floating-point unit (FPU) 524, similar to the architecture 530 discussed above. The hardware architecture 560 may also include a hardware hashtable implementation unit 528 that is separated from the CPU 520. For example the hardware hashtable implementation unit 528 may be in a specialized co-processor (not illustrated) that performs the hash operations and communicates the result to the CPU 520 via parallel or serial input/output ports.

Figure 5D:
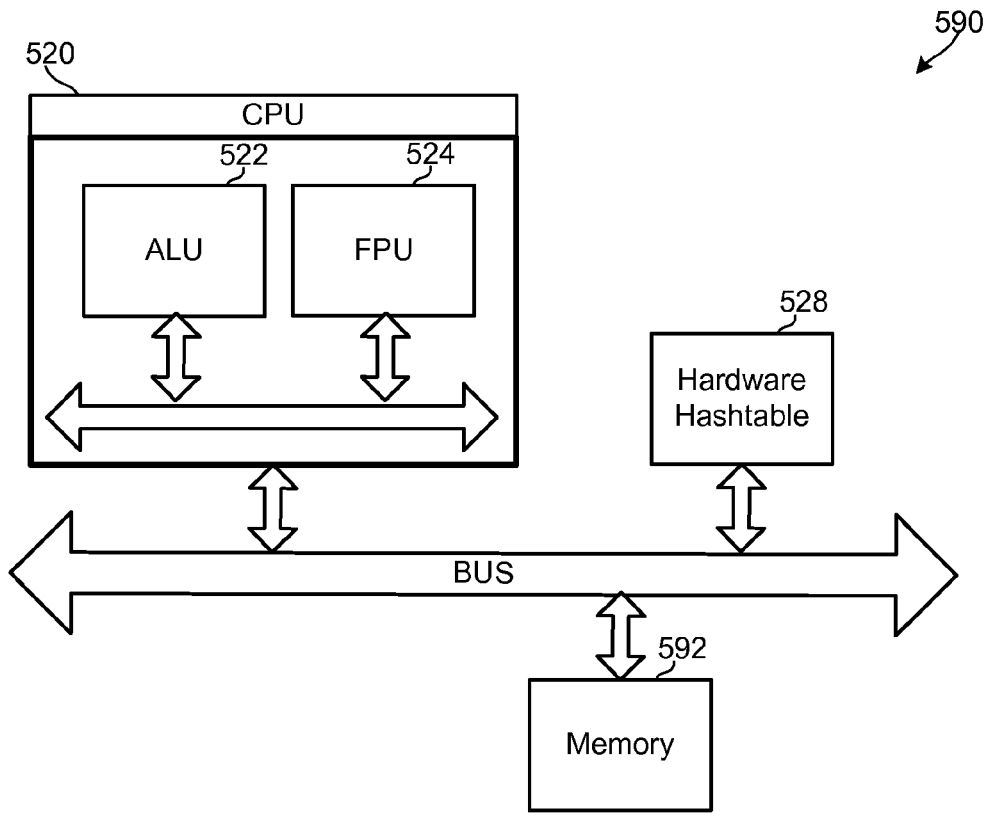

FIG. 5D illustrates another example embodiment hardware architecture 590 for executing hashtable operations in a combination of hardware and software. This embodiment hardware architecture 590 may include a central processing unit (CPU) 520 that includes an arithmetic logic unit (ALU) 522 and a floating-point unit (FPU) 524, similar to the architectures 530,560 discussed above. The hardware architecture 560 may also include a hardware hashtable implementation 528 and a memory mapped input/output (MMIO) accelerator device 592 that is separated from the CPU 520. The hardware architecture 590 may utilize the MMIO accelerator device 592 to perform the hash operations outside of the CPU 520 and communicate the results to the CPU 520 via a processor bus.

Returning to FIG. 5A, the operating system 502 may include a compiler 512 having a compiler hash module 516 that maps (e.g., hashes) JavaScript® strings to integer values at compile time. In an aspect, this mapping is only done once. In an aspect, the mapping may be used to generate a software hashtable 514 representation of the JavaScript® objects. This mapping is important because traditional methods for processing hashtables cannot be used to process JavaScript® objects in hardware. As discussed above, JavaScript® objects may be viewed as being a special type of hashtable that links a string value (key) to another string or number value (value). The use of a string value as a key (instead of an integer value) complicates the process of hashing, storing and retrieving values from a hashtable. For example, strings may contain any number of characters (i.e., they may be any length) whereas integer key-values contain a known number of bits or bytes. The use of strings as key-values precludes the use of simple mathematical algorithms to generate the hash values, such as using the last few digits of the key discussed above with reference to FIG. 3.

For these and other reasons, performing hashtable operations on hashtables having string values as keys requires the execution of thousands of software instructions. This is especially true when these hash operations are performed on JavaScript® objects, where the existence of nested hashes (a feature of JavaScript®) may turn a single hashtable lookup request into hundreds of hashtable lookup requests, each of which may require the execution of thousands of software instructions.

Current solutions for using a string as a hashtable key require lengthy and complicated software-based processing that cannot be implemented efficiently in hardware. To overcome these limitations, the compiler hash module 516 may map JavaScript® strings to integer values at compile time (i.e., as opposed to run time) in a manner that allows the hashtables operations (e.g., the JavaScript® code) to be executed by the hardware components. The compiler hash module 516 may generate the software hashtable 514, which is a hashtable (e.g., string-to-integer mappings) of hashtables (e.g., JavaScript® objects). This double hashing (or nested hashtable) allows portions of the software hashtable 514 to be stored in a hardware hashtable 518 such that the stored information may be accessed using a single read or a single write operation. This reduces the number of instructions required to execute each hash operation from the thousands typically required to a single instruction (e.g., read or write).

As mentioned above, every JavaScript® object may be viewed as being a hashtable, and a generalized hashtable processor (implemented in hardware) may be used to process the JavaScript® code. For example, each JavaScript® object may be processed in the generalized hashtable circuits of the processor 510 with significantly less instructions than current solutions. This reduced number of required instructions greatly improves the overall speed and efficiency of JavaScript® applications.

Returning to FIG. 5A, the compiler hash module 516 may execute the process for the string-to-integer mapping only once, which allows subsequent hashtable updates and look-ups to be executed with a single instruction by the hardware. This mapping also allows some of the hashtable support traditionally embedded in just-in-time compiler code to be moved to Instruction Set Architecture (ISA) extensions, such as a GET instruction and a SET instruction.

In an aspect, the processor may have three registers for processing the GET and SET instructions, which may be executed with three register parameters. The first two parameters (e.g., r1, r2) may be used to compute a key and the third parameter may be used for copying the resulting value for the GET instruction and for storing the value resulting from the SET instruction. The following pseudo code illustrates the use of the three parameters:

```
get r1, r2, r3 // r3 = HASH[key(r1, r2)]
set r1, r2, r3 // HASH[key(r1, r2)] = r3
```

In the above pseudo code, the first two registers (corresponding to parameters r1 and r2) are source registers and the third register (corresponding to parameter r3) is a destination register. The use of two registers (r1, r2) as the key facilitates the segregation of entries among objects and assists the processing of nested hashes, and is therefore is well suited for languages such as JavaScript®. For example, in the case of JavaScript®, one component of the key (e.g., r1) may map to a JavaScript® object and the other component of the key (e.g., r2) may map to a property of the JavaScript® object. "key" represents a mathematical transformation that constructs the hashtable keys from r1 and r2. "HASH" is the actual hashtable implementation that performs a value lookup based on the calculated key.

In an aspect, the instruction registers 506, 508 may be made accessible to the operating system in user mode (as opposed to super-user mode required for page table translations). This allows any process or application executing on the operating system to issue the above mentioned GET and SET instructions while operating in user mode. In an aspect, the hardware hashtable 518 may cache blocks of hashtable values such that the combination of hardware-based hashing functionality is available in user mode to each process as more fully discussed below.

Whenever a software process requests a hash operation (e.g. lookup), the computing device processor may first check the hardware (i.e., cache memory) for the existence of the requested hash value via the GET instruction. If the value is in hardware (i.e., cache memory), the instruction register may simply return the requested value, allowing the hash operation to be competed in one instruction. If the GET instruction indicates that the requested item is not in the hardware hashtable 518, a call may be made to a software hashtable 514 look-up process. The look-up process may perform the requested hash operation in software (e.g., on the software hashtable 514) and return both the requested value and surrounding values that are likely to be accessed in the future. These values may be pushed to the hardware cache 504 and stored in the hardware hashtable 518 (e.g., via the SET instruction) so that they are readily available to the processor 510 for future processing. In this manner, the various aspects exploit the principal of locality by pushing a block of generated hash information to the processor 510 cache memory via a SET instruction (e.g., issued on the "set" register 508). This operation enables values that are likely to be accessed in the future to be stored in the hardware hashtable 518 cache for fast processor access (e.g., via a single instructions) in subsequent operations.

To generate the software hashtable 514, the compiler 512 may, during the compilation of the code, create a global string table that assigns a unique ID to every string literal value. For dynamic objects, instead of having a cache, the compiler may use an array that holds the values of JavaScript® properties. To access a property, the compiler may look up the string ID of the property name and use another hashtable that maps a combination of object IDs and property string IDs and maps the combination to an integer that represents the field array index in the object representing the property value. The following pseudo code illustrates this process:

```
//z = o.x
ID1 = StringtoIDHash["x"];        // first hash lookup
ID2 = o.ID
ID3 = IdToIndexHash[ID1,ID2] //second hash lookup
                                  //Using the GET instruction
Z = o.Fields[ID3]
```

In the above pseudo code, the first hash lookup occurs only once and at compile time. On the other hand, the second hash lookup may occur every time the code is executed. However, since the second hash lookup uses the GET instruction only one instruction is executed, provided that the requested hash information is in the hardware hashtable.

As mentioned above, hash keys may be pushed to the hardware via the SET instruction so that values which are most likely to be accessed in the future may be stored in the hardware (i.e., cache). The following pseudo code illustrates the use of the SET instruction:

```
//o.x = z
ID1 = StringtoIDHash["x"];
ID2 = o.ID
ID3 = IdToIndexHash[ID1,ID2] //Using the GET instruction
IF (ID3 == -1) {
    ID3 = o.Fields.Legth
    IdToIndexHash[ID1, ID2] = ID3; //Using the SET instruction
}
o.Fields[ID3] = z
```

Figure 6:
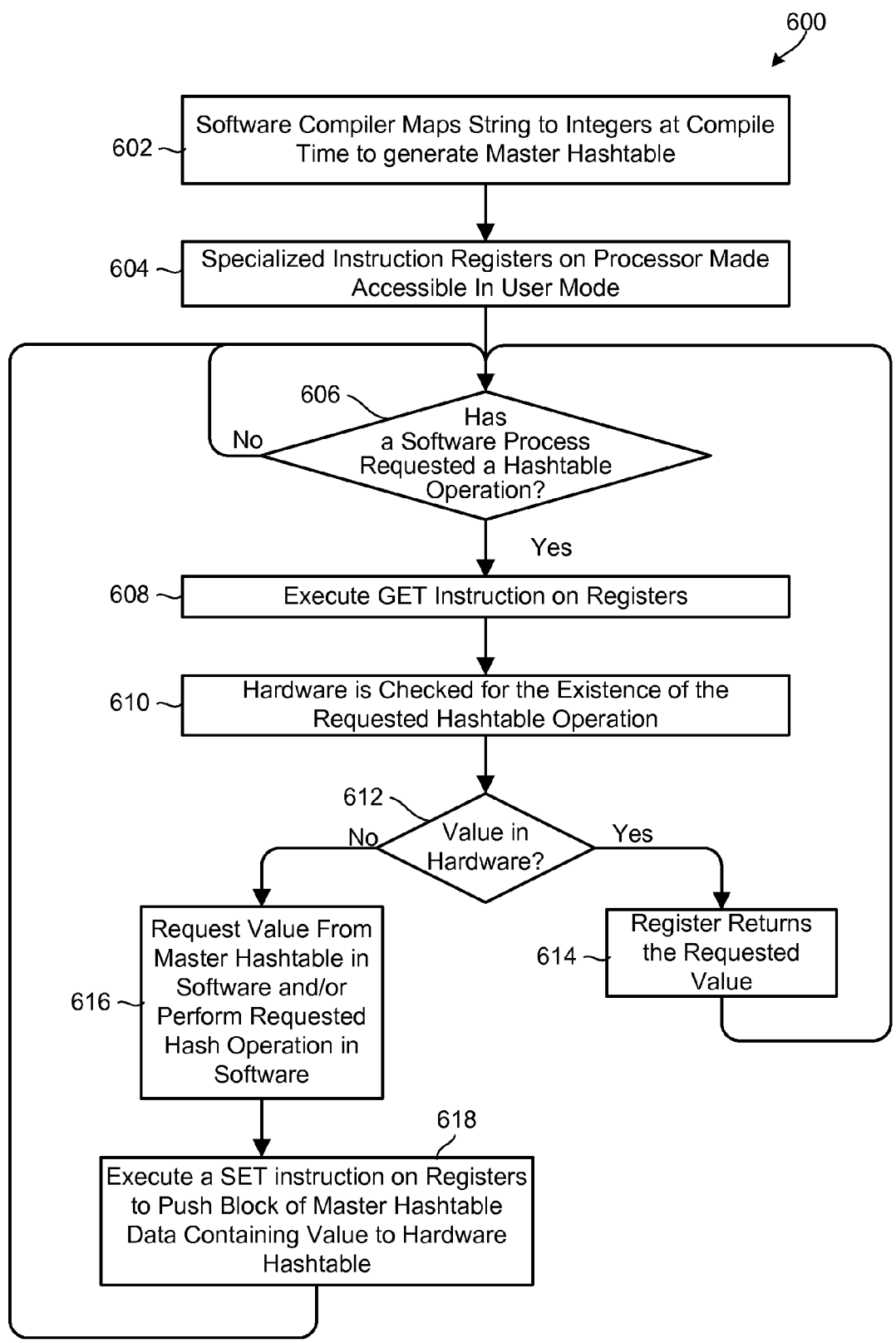
FIG. 6 is a process flow diagram of an example method suitable for use with the various aspects.

FIG. 6 illustrates an aspect method 600 for executing hashtable operations (e.g., JavaScript® operations) in a combination of hardware and software. In method 600 at block 602, a compiler may map the JavaScript® string keys to integers by assigning a unique ID to every string literal value (e.g., JavaScript® object) to generate a master hashtable at compile time, which is stored in software. In block 604, specialized instructions registers (ISA extensions) of a hardware processor having hashtable circuitry may be initialized such that they are available to the software in user mode. In determination block 606, the processor may wait for one or more software processes to request a hashtable operation (e.g., lookup). If a software process requests a hash operation (i.e., determination block 608="Yes"), a GET instruction may be issued to the processor on the specialized instructions registers in block 608. In block 610, a hardware hashtable may be accessed using the hashtable circuitry to determine if a value corresponding to the requested hashtable operation is in the hardware hashtable. In determination block 612, the processor may determine if the hardware hashtable contains the requested value. If the requested value is in the hardware hashtable (i.e., determination block 612="Yes"), the specialized instructions registers may return the requested value such that the hashtable operation is executed by the hardware in block 614. This operation may be executed using only one instruction and the results may be provided to the software process. If the requested value is not in the hardware hashtable (i.e., determination block 612="No"), the hardware may notify the software process that the value is not available in block 616. In block 616, the software process may request the value from the master hashtable such that the hashtable operation is performed by the software. In block 618, the software process may issue a SET instruction on the specialized instructions registers to push a block of hashtable values containing the requested value to the hardware hashtable. Once the requested value is returned in blocks 614 or 618, the processor may return to determination block 606 to wait for one or more software processes to request a hashtable operation (e.g., lookup).

Figure 7:
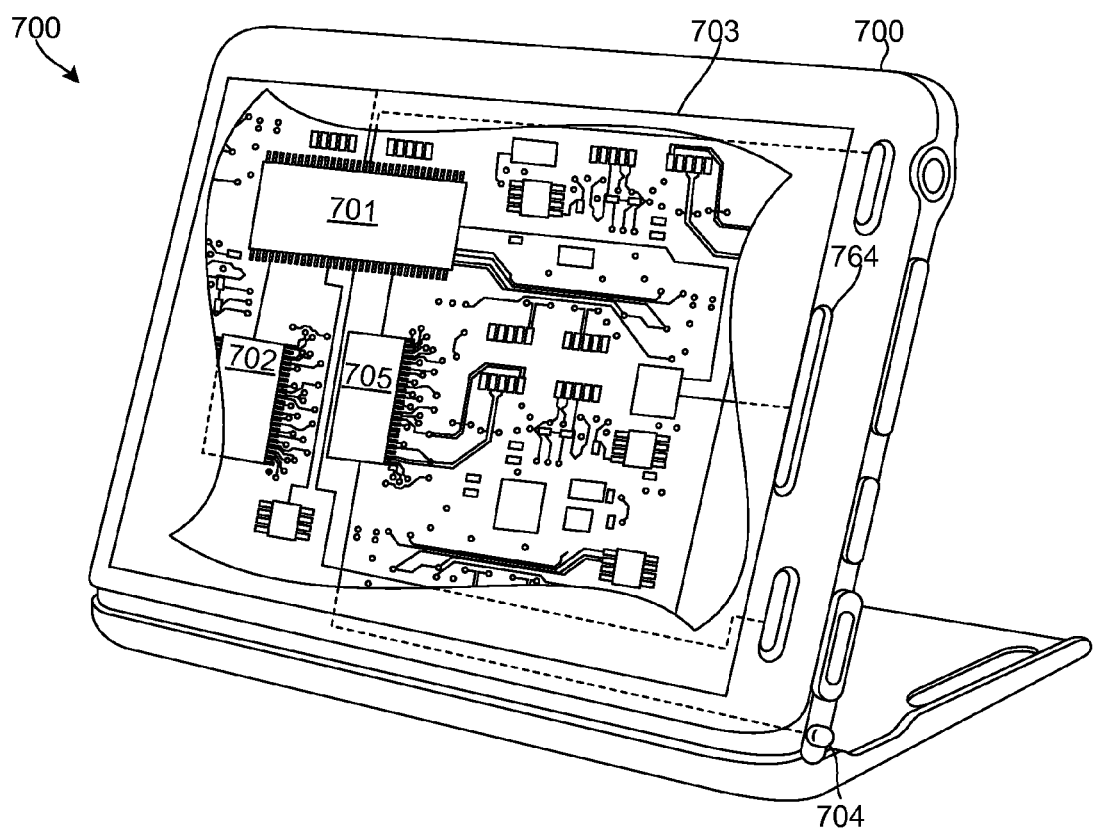
FIG. 7 is a cutaway perspective view of a mobile computing device suitable for use with the various aspects.

FIG. 7 is a system block diagram of a computing device suitable for use with any of the aspects. A typical computing device 700 may include a processor 701 coupled to internal large capacity memory 702 (e.g., FLASH memory), a display 703, and to a speaker 764. Additionally, the computing device 700 may also include an antenna 704 for sending and receiving electromagnetic radiation that may be connected to a wireless data link and/or cellular telephone transceiver 705 coupled to the processor 701. The various aspect methods for executing hashtable operations in hardware may be performed by portions of the processor 701 and memory 702. Alternatively dedicated modules within or coupled to the computing device 700 may perform the aspect methods.

The aspects described above may be implemented within a variety of hardware configurations, including configurations that utilize memory mapped input/output (MMIO) accelerator devices and co-processors. For example, MMIO devices may perform LOAD and STORE operations that correspond to the GET and SET instructions discussed above. In various aspects, hardware assisted virtual machine architectures may be used to implement the various features.

Figure 8:
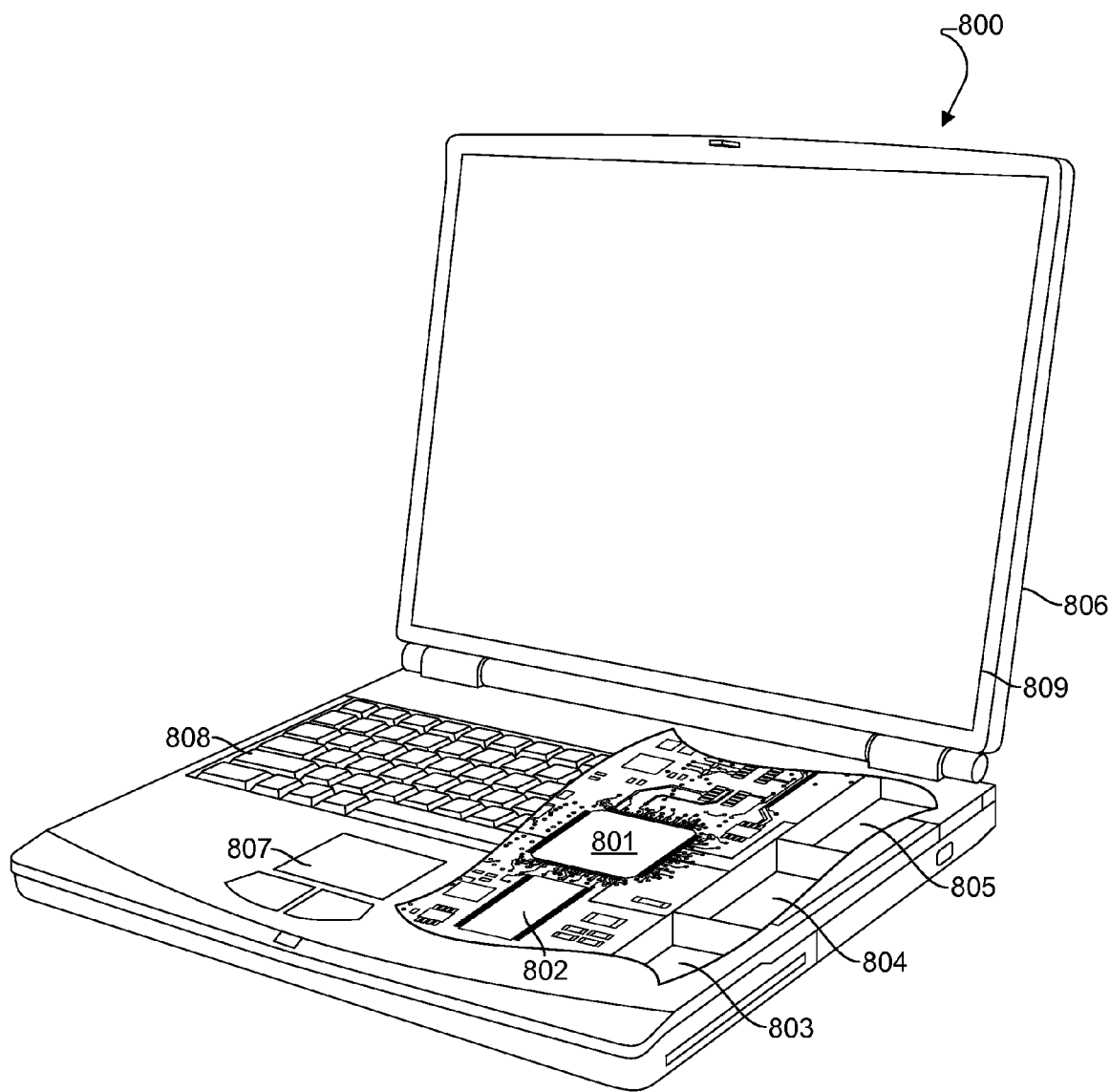
FIG. 8 is an illustration of an example computer suitable for use with the various aspects.

The aspects described above may also be implemented within a variety of computing devices, such as a laptop computer 800 as illustrated in FIG. 8. A laptop computer 800 will typically include a processor 801 coupled to volatile memory 802 and a large capacity nonvolatile memory, such as a disk drive 803. The computer 800 may also include a floppy disc drive 804 and a compact disc (CD) drive 805 coupled to the processor 801. The computer device 800 may also include a number of connector ports coupled to the processor 801 for establishing data connections or receiving external memory devices, such as a USB or FireWire® connector sockets, or other network connection circuits 806 for coupling the processor 801 to a network. In a notebook configuration, the computer housing includes the touchpad 807, keyboard 808, and the display 809 all coupled to the processor 801. Other configurations of computing device may include a computer mouse or trackball coupled to the processor (e.g., via a USB input) as are well known.

The processors 701, 801 may be any programmable microprocessor, microcomputer or multiple processor chip or chips that can be configured by software instructions (applications) to perform a variety of functions, including the functions of the various aspects described below. In some mobile receiver devices, multiple processors 701 may be provided, such as one processor dedicated to wireless communication functions and one processor dedicated to running other applications. Typically, software applications may be stored in the internal memory 702, 802, 803 before they are accessed and loaded into the processor 701, 801. In the various aspects, the processor 701, 801 also includes internal memory sufficient to store the application software instructions as well as cache memory for storing hashtables or blocks of hashtable values.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as a departure from the scope of the claims.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a non-transitory computer-readable or processor-readable medium. Non-transitory computer-readable media includes any physical (i.e., non-transitory) storage media that may be accessed by a computer or a processor of a computing device. By way of example, and not limitation, such non-transitory computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer or a processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions stored on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method implemented on a computing device for executing dynamic software language code, comprising:
    compiling the dynamic software language code to encode hashtable string keys as hashtable integer keys;
    storing the encoded hashtable integer keys in a software hashtable maintained in a memory accessible by software;
    loading a portion of the encoded hashtable integer keys stored in the software hashtable into a dedicated hardware hashtable implementation via a first dedicated hardware instruction,
    receiving a request for a hashtable value;
    determining whether the requested hashtable value is in the dedicated hardware hashtable implementation; and
    executing a hashtable look-up in the software hashtable to retrieve the requested hashtable value in response to determining that the requested hashtable value is not in the dedicated hardware hashtable implementation.

2. The method of claim 1, wherein the first dedicated hardware instruction is a SET instruction that pushes values to the dedicated hardware hashtable implementation.

3. The method of claim 2, wherein:
    determining whether the requested hashtable value is in the dedicated hardware hashtable implementation comprises determining whether the requested hashtable value may be retrieved by a hardware processor by executing a dedicated hardware instruction on the hardware processor; and
    the method further comprises executing a hardware-based hashtable lookup to return the requested hashtable value in response to determining that the requested hashtable value is stored in the hardware processor.

4. The method of claim 3, wherein:
    executing a hashtable look-up in the software hashtable to retrieve the requested hashtable value comprises executing a software-based hashtable look-up to retrieve the requested hashtable value stored in the software hashtable in response to determining that the requested hashtable value is not stored in the hardware processor; and
    the method further comprises updating the dedicated hardware hashtable implementation by loading the retrieved portions of encoded hashtable integer keys into a dedicated memory of the hardware processor via a second dedicated hardware instruction.

5. The method of claim 4, wherein the second dedicated hardware instruction is a GET instruction that retrieves values from the dedicated memory of the hardware processor.

6. The method of claim 5, wherein encoding hashtable string keys as hashtable integer keys is accomplished exactly once at compile time and the loading of a portion of the encoded hashtable integer keys is executed on each dynamic software language operation request.

7. The method of claim 5, wherein:
the dynamic software language code is JavaScript® code; and
compiling the dynamic software language code to encode hashtable string keys as hashtable integer keys comprises compiling JavaScript code to encode JavaScript hashtable string keys as hashtable integer keys.

8. The method of claim 7, wherein encoding JavaScript® hashtable string keys as hashtable integer keys is accomplished exactly once at compile time and the loading of a portion of the encoded hashtable integer keys is executed on each JavaScript® operation request.

9. The method of claim 1, wherein the first dedicated hardware instruction is a STORE instruction that pushes values to the dedicated hardware hashtable implementation by storing the values in a memory-mapped location.

10. The method of claim 1, wherein loading a portion of the encoded hashtable integer keys into a dedicated hardware hashtable implementation comprises loading a portion of the encoded hashtable integer keys into a dedicated hardware hashtable implementation on a coprocessor coupled to a primary processor.

11. The method of claim 1, wherein compiling the dynamic software language code to encode hashtable string keys as hashtable integer keys is performed by a first processor of a computing device and loading a portion of the encoded hashtable integer keys into a dedicated hardware hashtable implementation via a first dedicated hardware instruction is performed by a second processor of the computing device.

12. The method of claim 11, wherein the second processor of the computing device is a specialized hashtable co-processor.

13. The method of claim 12, wherein:
determining whether the requested hashtable value is in the dedicated hardware hashtable implementation comprises determining whether the requested hashtable value may be retrieved by executing a second dedicated hardware instruction on the specialized hashtable co-processor; and
the method further comprises executing a hardware-based hashtable lookup on the specialized hashtable co-processor to receive the requested hashtable value on the first processor of the computing device in response to determining that the requested hashtable value may be retrieved.

14. A computing device, comprising:
a memory; and
a processor coupled to the memory and configured with processor-executable instructions to perform operations comprising:
compiling dynamic software language code to encode hashtable string keys as hashtable integer keys;
storing the encoded hashtable integer keys in a software hashtable maintained in the memory so the encoded hashtable integer keys are accessible by software;
loading a portion of the encoded hashtable integer keys stored in the software hashtable into a dedicated hardware hashtable implementation via a first dedicated hardware instruction;
receiving a request for a hashtable value;
determining whether the requested hashtable value is in the dedicated hardware hashtable implementation; and
executing a hashtable look-up in the software hashtable to retrieve the requested hashtable value in response to determining that the requested hashtable value is not in the dedicated hardware hashtable implementation.

15. The computing device of claim 14, wherein the memory is a hashtable memory within the processor.

16. The computing device of claim 14, wherein the memory is external to the processor.

17. The computing device of claim 14, wherein the processor is configured with processor-executable instructions to perform operations such that the first dedicated hardware instruction is a SET instruction that pushes values to the dedicated hardware hashtable implementation.

18. The computing device of claim 17, wherein;
the processor is configured with processor-executable instructions to perform operations such that determining whether the requested hashtable value is in the dedicated hardware hashtable implementation comprises determining whether the requested hashtable value may be retrieved by a hardware processor by executing a dedicated hardware instruction on the hardware processor; and
the processor is configured with processor-executable instructions to perform operations further comprising executing a hardware-based hashtable lookup to return the requested hashtable value in response to determining that the requested hashtable value is stored in the hardware processor.

19. The computing device of claim 18, wherein:
the processor is configured with processor-executable instructions to perform operations such that executing a hashtable look-up in the software hashtable to retrieve the requested hashtable value comprises executing a software-based hashtable look-up to retrieve the requested hashtable value and a portion of the encoded hashtable integer keys stored in the software hashtable in response to determining that the requested hashtable value is not stored in the hardware processor; and
the processor is configured with processor-executable instructions to perform operations further comprising updating the dedicated hardware hashtable implementation by loading the retrieved portions of encoded hashtable integer keys into a dedicated memory of the hardware processor via a second dedicated hardware instruction.

20. The computing device of claim 19, wherein the processor is configured with processor-executable instructions to perform operations such that the second dedicated hardware instruction is a GET instruction that retrieves values from the dedicated memory of the hardware processor.

21. The computing device of claim 20, wherein the processor is configured with processor-executable instructions to perform operations such that the encoding hashtable string keys as hashtable integer keys is accomplished exactly once at compile time and the loading of a portion of the encoded hashtable integer keys is executed on each dynamic software language operation request.

22. The computing device of claim 20, wherein the processor is configured with processor-executable instructions to perform operations such that:
the dynamic software language code is JavaScript® code; and
compiling the dynamic software language code to encode hashtable string keys as hashtable integer keys comprises compiling JavaScript code to encode JavaScript hashtable string keys as hashtable integer keys.

23. The computing device of claim 22, wherein the processor is configured with processor-executable instructions to perform operations such that encoding JavaScript® hashtable string keys as hashtable integer keys is accomplished exactly once at compile time and the loading of a portion of the encoded hashtable integer keys is executed on each JavaScript® operation request.

24. The computing device of claim 14, wherein the processor is configured with processor-executable instructions to perform operations such that the first dedicated hardware instruction is a STORE instruction that pushes values to the dedicated hardware hashtable implementation by storing the values in a memory-mapped location.

25. The computing device of claim 14, wherein the processor is configured with processor-executable instructions to perform operations such that loading a portion of the encoded hashtable integer keys into a dedicated hardware hashtable implementation comprises loading a portion of the encoded hashtable integer keys into a dedicated hardware hashtable implementation on a co-processor coupled to a primary processor.

26. The computing device of claim 14, wherein the processor comprises a first processor and a second processor, and wherein the processor is configured with processor-executable instructions to perform operations such that compiling the dynamic software language code to encode hashtable string keys as hashtable integer keys is performed by the first processor and loading a portion of the encoded hashtable integer keys into a dedicated hardware hashtable implementation via a first dedicated hardware instruction is performed by the second processor of the computing device.

27. The computing device of claim 26, wherein the second processor is a specialized hashtable co-processor.

28. The computing device of claim 27, wherein:
the processor is configured with processor-executable instructions to perform operations such that determining whether the requested hashtable value is in the dedicated hardware hashtable implementation comprises determining whether the requested hashtable value may be retrieved by executing a second dedicated hardware instruction on the specialized hashtable co-processor; and
the processor is configured with processor-executable instructions to perform operations further comprising executing a hardware-based hashtable lookup on the specialized hashtable coprocessor to receive the requested hashtable value on the first processor of the computing device in response to determining that the requested hashtable value may be retrieved.

29. A computing device, comprising:
means for compiling dynamic software language code to encode hashtable string keys as hashtable integer keys;
means for storing encoded hashtable integer keys in a software hashtable maintained in a memory accessible by software;
means for loading a portion of the encoded hashtable integer keys stored in the software hashtable into a dedicated hardware hashtable implementation via a first dedicated hardware instruction;
means for receiving a request for a hashtable value;
means for determining whether the requested hashtable value is in the dedicated hardware hashtable implementation; and
means for executing a hashtable look-up in the software hashtable to retrieve the requested hashtable value in response to determining that the requested hashtable value is not in the dedicated hardware hashtable implementation.

30. The computing device of claim 29, wherein the memory is a hashtable memory within a processor of the computing device.

31. The computing device of claim 29, wherein the memory is external to a processor of the computing device.

32. The computing device of claim 29, wherein means for loading a portion of the encoded hashtable integer keys into a dedicated hardware hashtable implementation via a first dedicated hardware instruction comprises means for loading a portion of the encoded hashtable integer keys into a dedicated hardware hashtable implementation via a SET instruction that pushes values to the dedicated hardware hashtable implementation.

33. The computing device of claim 32, wherein:
means for determining whether the requested hashtable value is in the dedicated hardware hashtable implementation comprises means for determining whether the requested hashtable value may be retrieved by a hardware processor by executing a dedicated hardware instruction on the hardware processor; and
the computing device further comprises means for executing a hardware-based hashtable lookup to return the requested hashtable value in response to determining that the requested hashtable value is stored in the hardware processor.

34. The computing device of claim 33, wherein:
means for executing a hashtable look-up in the software hashtable to retrieve the requested hashtable value comprises means for executing a software-based hashtable look-up to retrieve the requested hashtable value and a portion of the encoded hashtable integer keys stored in the software hashtable in response to determining that the requested hashtable value is not on the hardware processor; and
the computing device further comprises means for updating the dedicated hardware hashtable implementation by loading the retrieved portions of encoded hashtable integer keys into a dedicated memory of the hardware processor via a second dedicated hardware instruction.

35. The computing device of claim 34, wherein means for updating the dedicated hardware hashtable implementation by loading the retrieved portions of encoded hashtable integer keys into a dedicated memory of the hardware processor via a second dedicated hardware instruction comprises means for updating the dedicated hardware hashtable implementation by loading the retrieved portions of encoded hashtable integer keys into a dedicated memory of the hardware processor via a GET instruction that retrieves values from the dedicated memory of the hardware processor.

36. The computing device of claim 35, wherein:
means for compiling the dynamic software language code to encode hashtable string keys as hashtable integer keys comprises means for compiling the dynamic software language code to encode hashtable string keys as hashtable integer keys exactly once at compile time; and
means for loading a portion of the encoded hashtable integer keys into a dedicated hardware hashtable implementation via a first dedicated hardware instruction comprise means for loading a portion of the encoded hashtable integer keys into a dedicated hardware hashtable implementation via a first dedicated hardware instruction on each dynamic software language operation request.

37. The computing device of claim 35, wherein:
the dynamic software language code is JavaScript® code; and means for compiling the dynamic software language code to encode hashtable string keys as hashtable integer keys comprises means for compiling JavaScript code to encode JavaScript hashtable string keys as hashtable integer keys.

38. The computing device of claim 37, wherein:
means for encoding JavaScript® hashtable string keys as hashtable integer keys comprises means for encoding JavaScript® hashtable string keys as hashtable integer keys exactly once at compile time; and
means for loading a portion of the encoded hashtable integer keys into a dedicated hardware hashtable implementation via a first dedicated hardware instruction comprises means for loading a portion of the encoded hashtable integer keys into a dedicated hardware hashtable implementation via a first dedicated hardware instruction on each JavaScript® operation request.

39. The computing device of claim 29, wherein the first dedicated hardware instruction is a STORE instruction that pushes values to the dedicated hardware hashtable implementation by storing the values in a memory-mapped location.

40. The computing device of claim 29, wherein means for loading a portion of the encoded hashtable integer keys into a dedicated hardware hashtable implementation comprises means for loading a portion of the encoded hashtable integer keys into a dedicated hardware hashtable implementation on a co-processor coupled to a primary processor.

41. The computing device of claim 29, further comprising:
a first processor; and
a second processor;
wherein:
    means for compiling the dynamic software language code to encode hashtable string keys as hashtable integer keys comprises means for compiling the dynamic software language code to encode hashtable string keys as hashtable integer keys by the first processor; and
    means for loading a portion of the encoded hashtable integer keys into a dedicated hardware hashtable implementation via a first dedicated hardware instruction comprises means for loading a portion of the encoded hashtable integer keys into a dedicated hardware hashtable implementation via a first dedicated hardware instruction by the second processor.

42. The computing device of claim 41 for, wherein the second processor is a specialized hashtable co-processor.

43. The computing device of claim 42, wherein:
means for determining whether the requested hashtable value is in the dedicated hardware hashtable implementation comprises means for determining whether the requested hashtable value may be retrieved by executing a second dedicated hardware instruction on the specialized hashtable co-processor; and
the computing device further comprises means for executing a hardware-based hashtable lookup on the specialized hashtable co-processor to receive the requested hashtable value on the first processor of the computing device in response to determining that the requested hashtable value may be retrieved.

44. A non-transitory processor-readable medium having stored thereon processor-executable instructions configured to cause a processor to perform operations comprising:
compiling dynamic software language code to encode hashtable string keys as hashtable integer keys;
storing the encoded hashtable integer keys in a software hashtable maintained in memory accessible by software;
loading a portion of the encoded hashtable integer keys stored in the software hashtable into a dedicated hardware hashtable implementation via a first dedicated hardware instruction;
receiving a request for a hashtable value;
determining whether the requested hashtable value is in the dedicated hardware hashtable implementation; and
executing a hashtable look-up in the software hashtable to retrieve the requested hashtable value in response to determining that the requested hashtable value is not in the dedicated hardware hashtable implementation.

45. The non-transitory processor-readable medium of claim 44, wherein the stored processor-executable instructions are configured to function on a processor in which the memory is a hashtable memory within the processor.

46. The non-transitory processor-readable medium of claim 44, wherein the stored processor-executable instructions are configured to function on a processor in which the memory is external to the processor.

47. The non-transitory processor-readable medium of claim 44, wherein the stored processor-executable instructions are configured to cause a processor to perform operations such that the first dedicated hardware instruction is a SET instruction that pushes values to the dedicated hardware hashtable implementation.

48. The non-transitory processor-readable medium of claim 47, wherein;
the stored processor-executable instructions are configured to cause a processor to perform operations such that determining whether the requested hashtable value may be retrieved by a hardware processor by executing a dedicated hardware instruction on the hardware processor; and
the stored processor-executable instructions are configured to cause a processor to perform operations further comprising executing a hardware-based hashtable lookup to return the requested hashtable value in response to determining that the requested hashtable value is stored in the hardware processor.

49. The non-transitory processor-readable medium of claim 48, wherein;
the stored processor-executable instructions are configured to cause a processor to perform operations such that executing a software-based hashtable look-up to retrieve the requested hashtable value and a portion of the encoded hashtable integer keys stored in the software accessible memory in response to determining that the requested hashtable value is not stored in the hardware processor; and
the stored processor-executable instructions are configured to cause a processor to perform operations further comprising updating the dedicated hardware hashtable implementation by loading the retrieved portions of encoded hashtable integer keys into a dedicated memory of the hardware processor via a second dedicated hardware instruction.

50. The non-transitory processor-readable medium of claim 49, wherein the stored processor-executable instructions are configured to cause a processor to perform operations such that the second dedicated hardware instruction is a GET instruction that retrieves values from the dedicated memory of the hardware processor.

51. The non-transitory processor-readable medium of claim 50, wherein the stored processor-executable instructions are configured to cause a processor to perform operations such that the encoding hashtable string keys as hashtable integer keys is accomplished exactly once at compile time and the loading of a portion of the encoded hashtable integer keys is executed on each dynamic software language operation request.

52. The non-transitory processor-readable medium of claim 50, wherein the stored processor-executable instructions are configured to cause a processor to perform operations such that:
the dynamic software language code is JavaScript® code; and
compiling the dynamic software language code to encode hashtable string keys as hashtable integer keys comprises compiling JavaScript code to encode JavaScript hashtable string keys as hash table hashtable integer keys.

53. The non-transitory processor-readable medium of claim 52, wherein the stored processor-executable instructions are configured to cause a processor to perform operations such that encoding JavaScript® hashtable string keys as hashtable integer keys is accomplished exactly once at compile time and the loading of a portion of the encoded hashtable integer keys is executed on each JavaScript® operation request.

54. The non-transitory processor-readable medium of claim 44, wherein the stored processor-executable instructions are configured to cause a processor to perform operations such that the first dedicated hardware instruction is a STORE instruction that pushes values to the dedicated hardware hashtable implementation by storing the values in a memory-mapped location.

55. The non-transitory processor-readable medium of claim 44, wherein the stored processor-executable instructions are configured to cause a processor to perform operations such that loading a portion of the encoded hashtable integer keys into a dedicated hardware hashtable implementation comprises loading a portion of the encoded hashtable integer keys into a dedicated hardware hashtable implementation on a co-processor coupled to a primary processor.

56. The non-transitory processor-readable medium of claim 44, wherein the stored processor-executable instructions are configured to be executable by a processor that comprises a first processor and a second processor, and wherein the stored processor-executable instructions are configured to cause the processor to perform operations such that compiling the dynamic software language code to encode hashtable string keys as hashtable integer keys is performed by the first processor and loading a portion of the encoded hashtable integer keys into a dedicated hardware hashtable implementation via a first dedicated hardware instruction is performed by the second processor of the computing device.

57. The non-transitory processor-readable medium of claim 56, wherein the second processor is a specialized hashtable co-processor.

58. The non-transitory processor-readable medium of claim 57, wherein;
the stored processor-executable instructions are configured to cause the processor to perform operations such that determining whether the requested hashtable value may be retrieved by executing a second dedicated hardware instruction on the specialized hashtable coprocessor; and
the stored processor-executable instructions are configured to cause the processor to perform operations further comprising executing a hardware-based hashtable lookup on the specialized hashtable co-processor to receive the requested hashtable value on the first processor of the computing device in response to determining that the hashtable value may be retrieved.

* * * * *